United States Patent
Boguraev et al.

(10) Patent No.: US 10,042,921 B2
(45) Date of Patent: Aug. 7, 2018

(54) ROBUST AND READILY DOMAIN-ADAPTABLE NATURAL LANGUAGE INTERFACE TO DATABASES

(71) Applicant: International Business Machines Corporation, Armonk, NY (US)

(72) Inventors: Branimir K. Boguraev, Bedford, NY (US); Elahe Khorasani, Yorktown Heights, NY (US); Vadim Sheinin, Yorktown Heights, NY (US); Siddharth A. Patwardhan, Yorktown Heights, NY (US); Petros Zerfos, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 14/858,912

(22) Filed: Sep. 18, 2015

(65) Prior Publication Data
US 2017/0083615 A1    Mar. 23, 2017

(51) Int. Cl.
*G06F 17/30* (2006.01)
*G06F 3/0481* (2013.01)
*G06F 17/27* (2006.01)

(52) U.S. Cl.
CPC .... *G06F 17/30684* (2013.01); *G06F 3/04812* (2013.01); *G06F 17/271* (2013.01)

(58) Field of Classification Search
CPC ............. G06F 17/30684; G06F 17/271; G06F 3/04812; G06F 17/2705; G06F 17/30654; G06F 17/30604; G06F 17/20; G06F 17/30625; G06F 17/30914

USPC ...................................................... 707/755
See application file for complete search history.

(56) References Cited

U.S. PATENT DOCUMENTS

| | | | |
|---|---|---|---|
| 7,398,201 B2 * | 7/2008 | Marchisio | G06F 17/271 704/9 |
| 2004/0029085 A1 * | 2/2004 | Hu | |
| 2004/0068489 A1 | 4/2004 | Dettinger et al. | |
| 2007/0078642 A1 * | 4/2007 | Weng | G10L 15/1822 704/4 |
| 2007/0233660 A1 * | 10/2007 | Rogers | G06F 17/2705 |
| 2009/0077180 A1 * | 3/2009 | Flowers | G06F 17/30654 709/206 |

(Continued)

OTHER PUBLICATIONS

Majdi Owda et al.; Information Extraction for SQL Query Generation in the Conversation-Based Interfaces to Relational Databases (C-BIRD); Springer.Com; 2011 and Springer.

(Continued)

*Primary Examiner* — Thanh-Ha Dang
(74) *Attorney, Agent, or Firm* — Cahn & Samuels, LLP

(57) ABSTRACT

An embodiment of the invention provides a method for including receiving a natural language query from a user with an interface, and generating multiple dependency parses of the natural language query with a parser device connected to the interface. The generating of the multiple dependency parses includes dividing the natural language query into multiple components, and creating a single dependency parse by connecting each component of the components with at least one other component of the components. A processor connected to the parser device applies rules to all of the multiple dependency parses to identify entities and relations in the natural language query.

19 Claims, 28 Drawing Sheets

(56) References Cited

U.S. PATENT DOCUMENTS

| | | | |
|---|---|---|---|
| 2010/0275179 A1* | 10/2010 | Mengusoglu | G06F 8/10 |
| | | | 717/104 |
| 2013/0262501 A1* | 10/2013 | Kuchmann-Beauger | ............... |
| | | | G06F 17/30958 |
| | | | 707/769 |
| 2013/0311166 A1 | 11/2013 | Yanpolsky | |
| 2014/0149446 A1 | 5/2014 | Kuchmann-Beauger et al. | |
| 2015/0058349 A1* | 2/2015 | Ramnani | G06F 17/30705 |
| | | | 707/740 |
| 2015/0261744 A1* | 9/2015 | Suenbuel | G06F 17/271 |
| | | | 704/9 |

OTHER PUBLICATIONS

Hasan M Jamil; A Natural Language Interface Plug-In for Cooperative Query Answering in Biological Databases; NCBI.Com; PMC3323828; Jun. 11, 2012 and NCBI.

Sefali Koli et al.; Natural Language Query Processing on Dynamic Databases using Semantic Grammar; IOSR Journal of Computer Engineering and iosrjournals.org.

Androutsopoulos et al.; Natural Language Interfaces to Databases—An Introduction; Research Paper No. 709, Department of Artificial Intelligence, University of Edinburgh, 1994.

* cited by examiner

FIG. 3

"When was the last time this circuit was fixed?"

- Employee has salary; table is Employees; column is salary.
- Employee works in a department; table is Employees; column is employee_id; table1 is Departments; column1 is department_id.

FIG. 5

- root=VAR1_has_VAR2 # template rule
  -> has [hasPartOfSpeech("verb"), hasLemmaForm("have")]
  {subj -> VAR1 [hasLemmaForm("VAR1")]}
  {obj -> VAR2 [hasLemmaForm("VAR2")]}

- root=VAR1_has_VAR2 #non lexical rule
  -> has [hasPartOfSpeech("verb"), hasLemmaForm("have")]
  {subj -> VAR1 [ ]}
  {obj -> VAR2 []}

FIG. 6

```
root=employee_has_salary
-> has [hasPartOfSpeech("verb"), hasLemmaForm("have")]
   {subj -> employee [hasLemmaForm("employee")]}
   {obj -> salary [hasLemmaForm("salary")]} root=function_employee_has_salary
-> salary [hasPartOfSpeech("noun"),hasLemmaForm("salary")]
   {mod_nobj | mod_ncomp -> of [hasLemmaForm("of")]
      {objprep -> employee [hasLemmaForm("employee")]}
   {mod_nadj -> value1 [hasLemmaFormFromList("high","low"),
                        hasParseFeature("superl")]}
```

FIG. 7

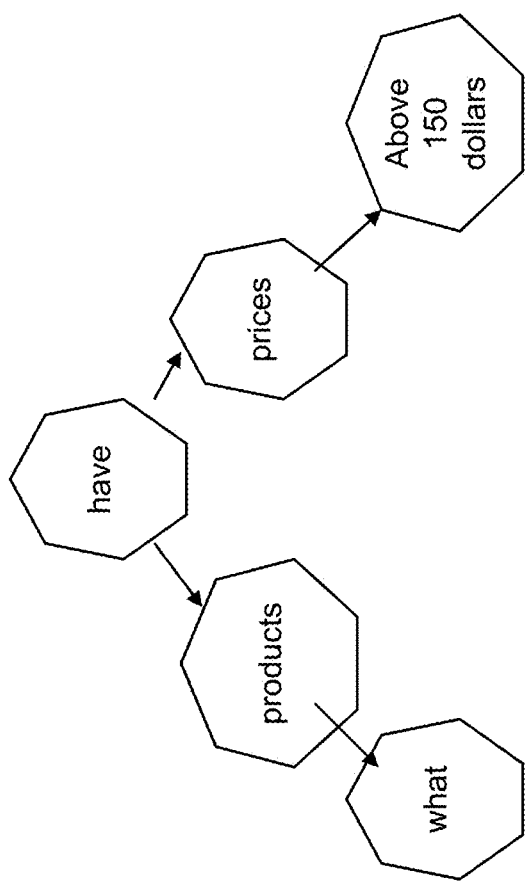

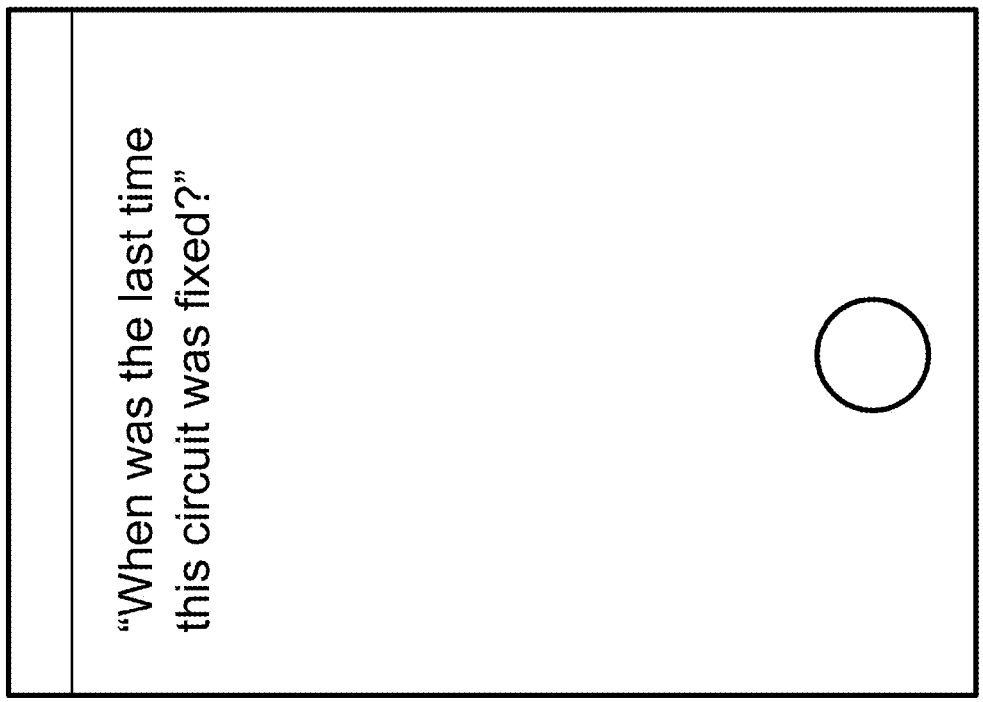

ROBUST AND READILY DOMAIN-ADAPTABLE NATURAL LANGUAGE INTERFACE TO DATABASES

BACKGROUND

The present invention relates to systems, methods, and computer program products for a robust and readily domain-adaptable natural language interface to databases.

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

SUMMARY OF THE INVENTION

An embodiment of the invention provides a method for including receiving a natural language query from a user with an interface, and generating multiple dependency parses of the natural language query with a parser device connected to the interface. The generating of the multiple dependency parses includes dividing the natural language query into multiple components, and creating a single dependency parse by connecting each component of the components with at least one other component of the components. A processor connected to the parser device applies rules to all of the multiple dependency parses to identify entities and relations in the natural language query.

BRIEF DESCRIPTION OF THE SEVERAL VIEWS OF THE DRAWINGS

The present invention is described with reference to the accompanying drawings. In the drawings, like reference numbers indicate identical or functionally similar elements.

FIG. 3 illustrates a system interface according to an embodiment of the invention.

FIG. 5 illustrates rules for the detection of entities and relations according to an embodiment of the invention.

FIG. 6 illustrates template rules according to an embodiment of the invention.

FIG. 7 illustrates a schema annotation file according to an embodiment of the invention.

FIG. 11 is a diagram illustrating parsing of another natural language query according to an embodiment of the invention.

FIG. 14A illustrates a smartphone interface according to an embodiment of the invention.

DETAILED DESCRIPTION

Exemplary, non-limiting embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

Figure 1:
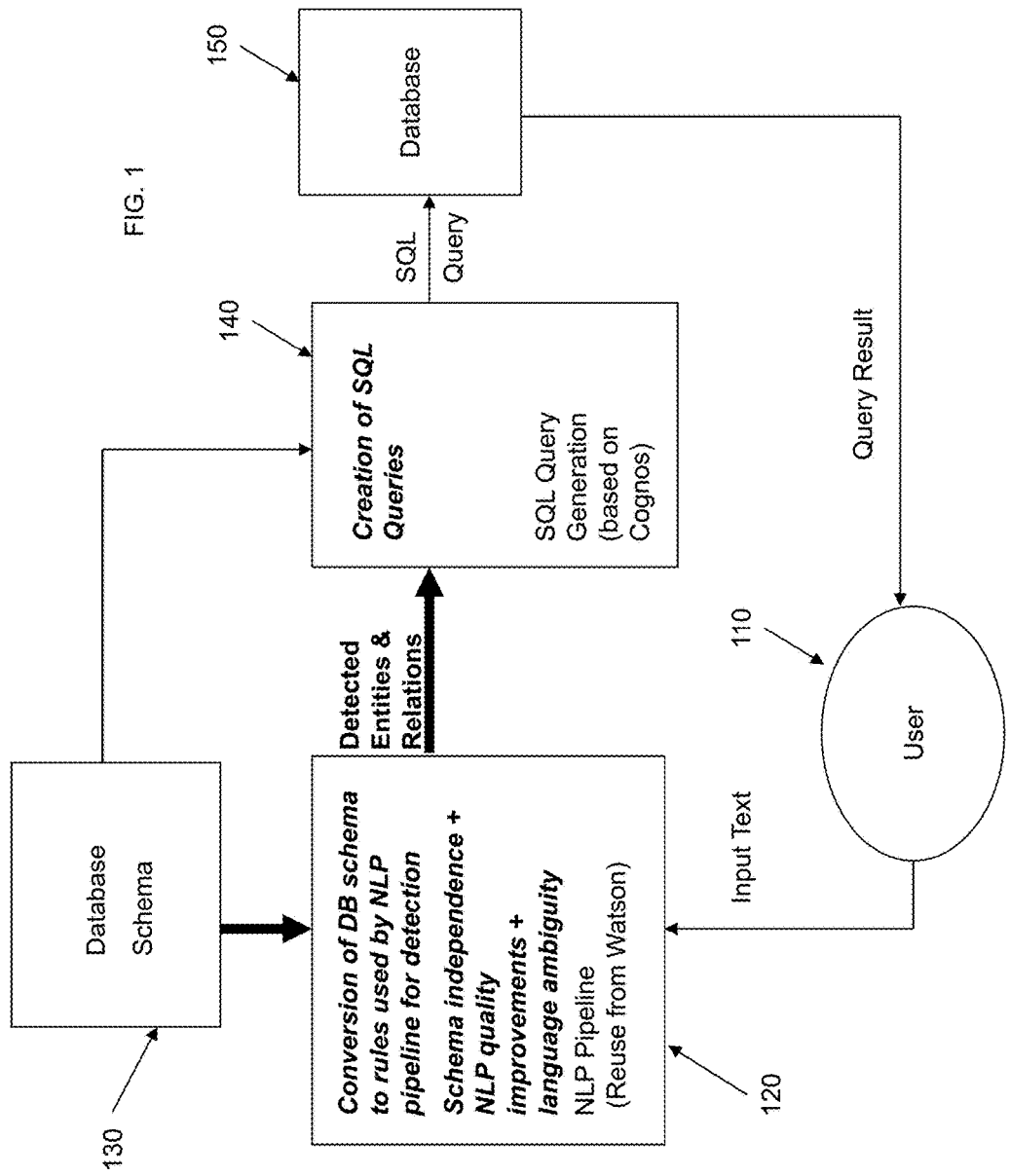
FIG. 1 is a flow diagram illustrating a search query from natural language processing to structured query language to a query result according to an embodiment of the invention.

At least one embodiment of the invention includes a system and method that utilizes natural language processing (NLP) to automatically create structured query language (SQL) queries from regular English sentences. FIG. 1 is a flow diagram illustrating a search query from NLP to SQL to a query result according to an embodiment of the invention, wherein input text from a user 110 is received in NLP pipeline 120. Detected entities and relations from the NLP pipeline 120 and data from a database schema 130 can be used in the creation of SQL queries 140.

The data from the database schema 130 can also be used in the NLP pipeline 120. Specifically, conversion of the database schema 130 to rules can be used by the NLP pipeline 120 for the detection of entities. The SQL query can be sent to a database 150; and, the query result can be sent from the database 150 to the user 110.

Thus, a domain independent system can be provided through the automatic generation of rules used for the detection of entities and relations. Template rules can be used that are domain independent and that are derived from the language itself. Paraphrase generation can also be used to automatically enrich system coverage. Robustness can be improved through the use of multiple parses; and, parts of the question that should be used in the produced SQL but didn't make it can be automatically identified.

Figure 2:
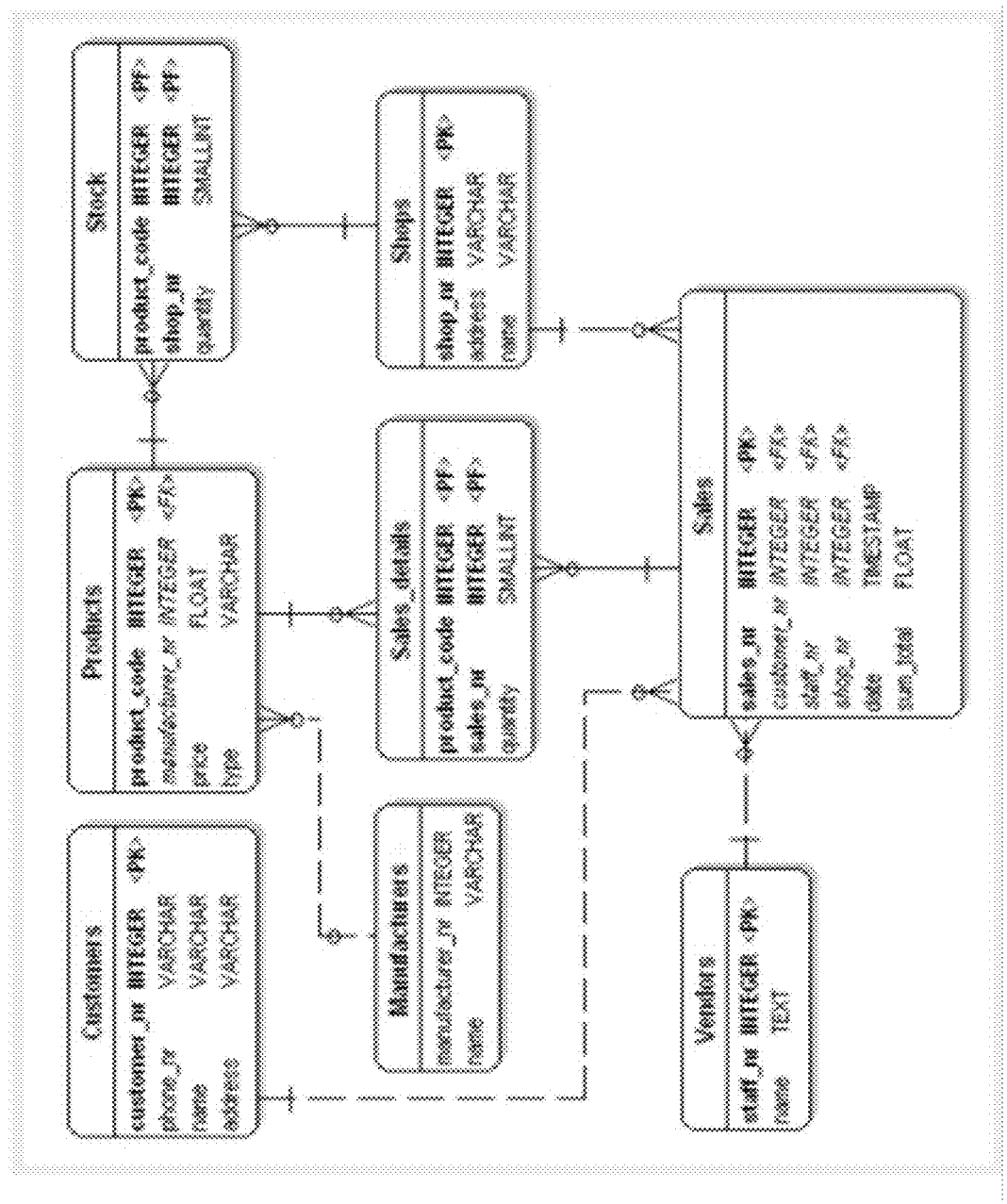
FIG. 2 illustrates the schema for the sales warehouse database according to an embodiment of the invention.

The following use case 1 example involves a CMO in the retail industry. John is the CMO of ABC Company; and, he wants to find out "What are the types of products that were sold on Oct. 11, 2014 in shops that are located in New York?" FIG. 2 illustrates an example schema for the sales warehouse database according to an embodiment of the invention.

Figure 3:
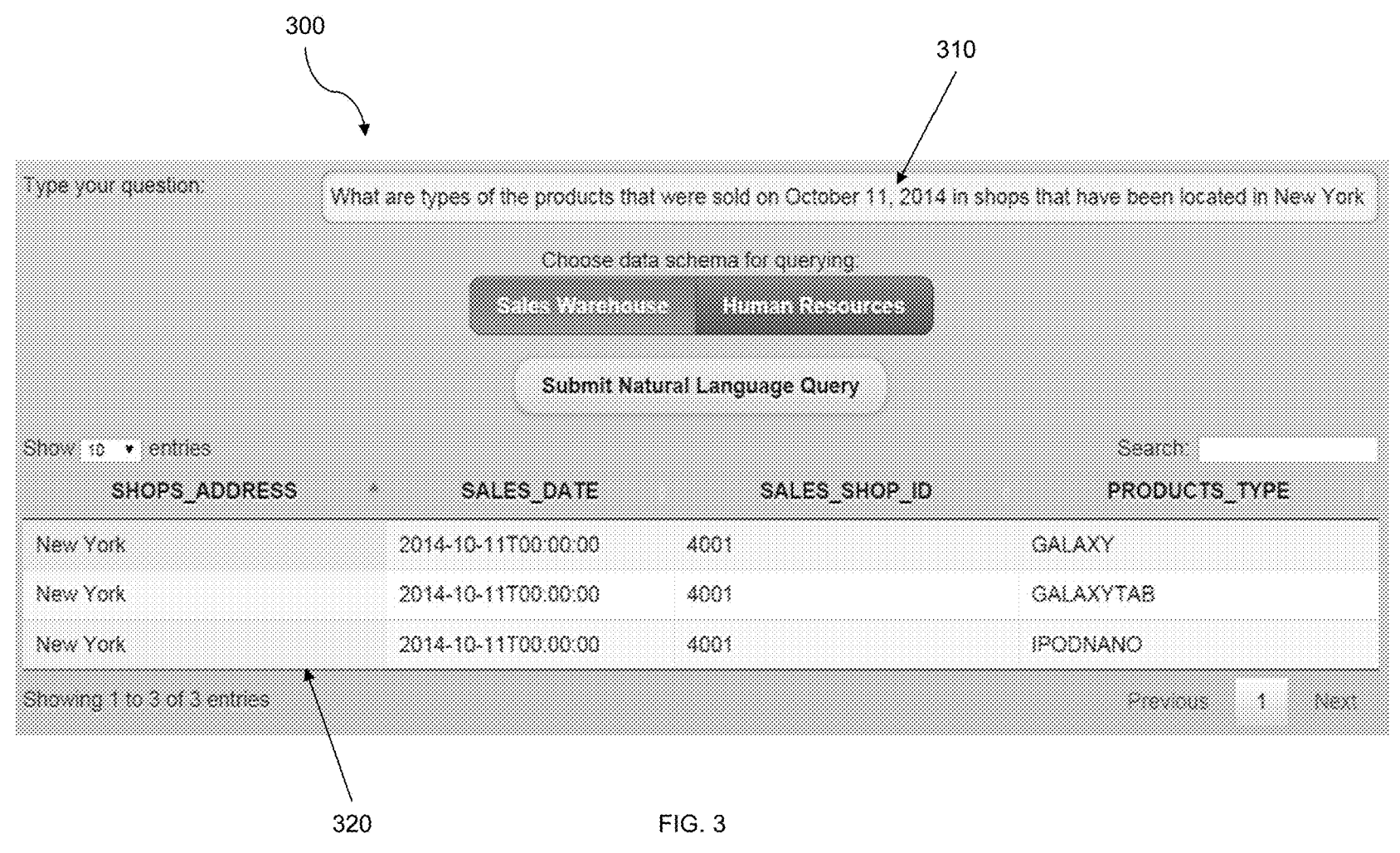

FIG. 3 illustrates a system interface 300 according to an embodiment of the invention. John can type his question (e.g., "What are the types of products that were sold on Oct. 11, 2014 in shops that are located in New York") into a search box 310 and the system will convert his question to SQL. Even if John makes a mistake in his question (e.g., "What are the types of the products that were sold in Oct. 11, 2014 in shops that have been located in New York"), the proper SQL query can be produced. The results of the query can be displayed in the search results 320.

Various lines of business, such as for example, marketing associates, merchants, brick-and-mortar store associates, and field workers, may want to have quick interaction with data stored in relational data bases. In order to get to the data, natural language queries from the various lines of business is converted to SQL.

The following use case 2 example involves a field worker for a telephone company. Jane is the field worker for ABC Telco company in the United States. When she receives a work order, she goes to the field to visit, evaluate, and resolve the issue. ABC Telco recently equipped all technicians with smartphones. When Jane arrives at the location, she needs to know: 1) "when was the last time the circuit was fixed?", 2) "what was the last issue on the circuit?", 3) "when was the circuit originally installed?", 4) "what was the last report on the circuit? what was changed in the last repair?". Jane has to work outside and it is a very cold day. It is very difficult for Jane to type her questions so she speaks into her smartphone and sees the information on the screen.

Figure 4A:
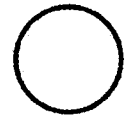
FIG. 4A illustrates a smartphone interface according to an embodiment of the invention.
Figure 4B:
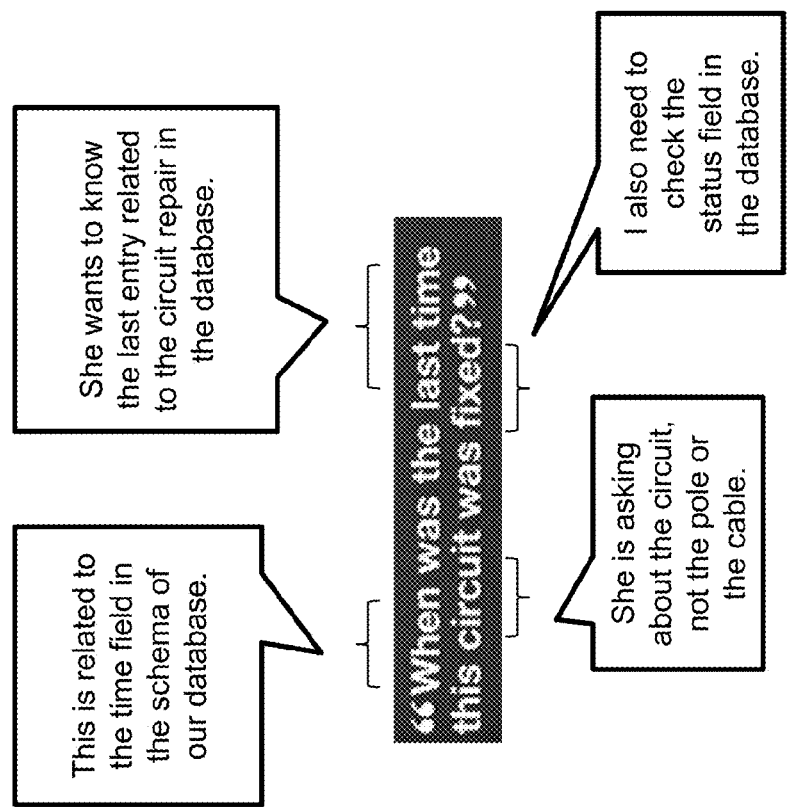
FIG. 4B is a diagram illustrating extraction of key concepts from a natural language query according to an embodiment of the invention.

More specifically, as illustrated in FIG. 4A, Jane speaks her question "When was the last time this circuit was fixed?" into her smartphone. In at least one embodiment, the system resides in the smartphone and interprets the spoken sentence, parses the spoken sentence, extracts key concepts and their values, and relates the concepts to the database schema. FIG. 4B is a diagram illustrating extraction of key concepts from a natural language query according to an embodiment of the invention, wherein the system extracts: that this is related to the "time" field in the schema of our database from the word "When", she wants to know the last entry related to the circuit repair in the database from the words "last time", she is asking about the circuit, not the pole or the cable from the word "circuit", and the status field in the database should be checked for the word "fixed".

Figures 4C, 4D:
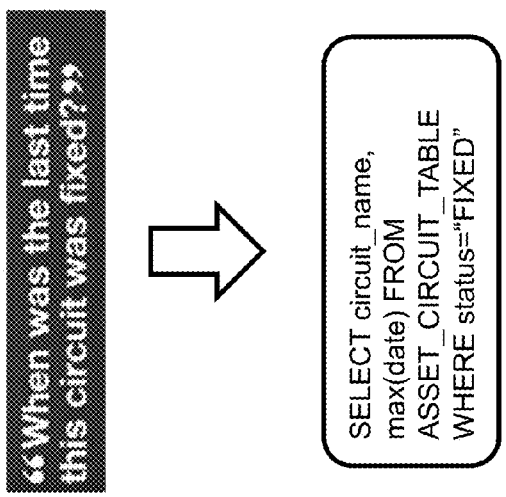
FIG. 4C is a diagram illustrating translation to SQL commands according to an embodiment of the invention.
FIG. 4D illustrates search results displayed on the smartphone interface according to an embodiment of the invention.

The system can convert the spoken sentence to SQL commands and send the SQL query to ABC databases. FIG. 4C is a diagram illustrating translation to SQL commands according to an embodiment of the invention. The system can return the results of the search to the application running on the smartphone. FIG. 4D illustrates search results displayed on the smartphone interface according to an embodiment of the invention.

In at least one embodiment of the invention, the detection of entities and relations is rule based, wherein an engine receives rules of detection as input and finds matches for these rules on a dependency tree. To be schema independent, rules for detection can be created automatically using template rules and a schema annotation file. FIG. 5 illustrates a schema annotation file according to an embodiment of the invention. The schema annotation file indicates that the database includes a table of "Employees", which includes a column having "employee_id" and a column having "salaries", and a table of "Departments", which includes a column having "department_id".

FIG. 6 illustrates template rules according to an embodiment of the invention. The template rules require that a subject (VAR1) verb (has) an object (VAR2). The template rules and schema annotation file can be used to automatically generate rules for the detection of entities and relations in a natural language query. Template rules can represent widely used constructs of a natural language. One example is an ownership construct: department has a manager, employee has a salary, customer has an address. Such construct can be represented as a verb "to have" with a subject and an object. The subject can describe who owns something and the object can describe what is owned by the subject. From the dependency tree perspective, this construct can be represented as a graph containing 3 nodes: the main one being a verb with lemma form "have" and two children nodes connected to it. One child node can be connected to the main node through an edge labeled "subject", and another child node can be connected to the main node through an edge labeled "object". In addition, the subject node can have a particular lemma form (e.g. "employee"), and the object also can have a particular lemma form (e.g. "salary"). Another construct can include subject-verb-object (where verb is an arbitrary verb) or subject-verb-preposition-object. Examples include: a customer buys product, employee works in a department, etc. Another construct can include adjective (superlative)-noun, highest salary, lowest salary etc.

Figure 8:
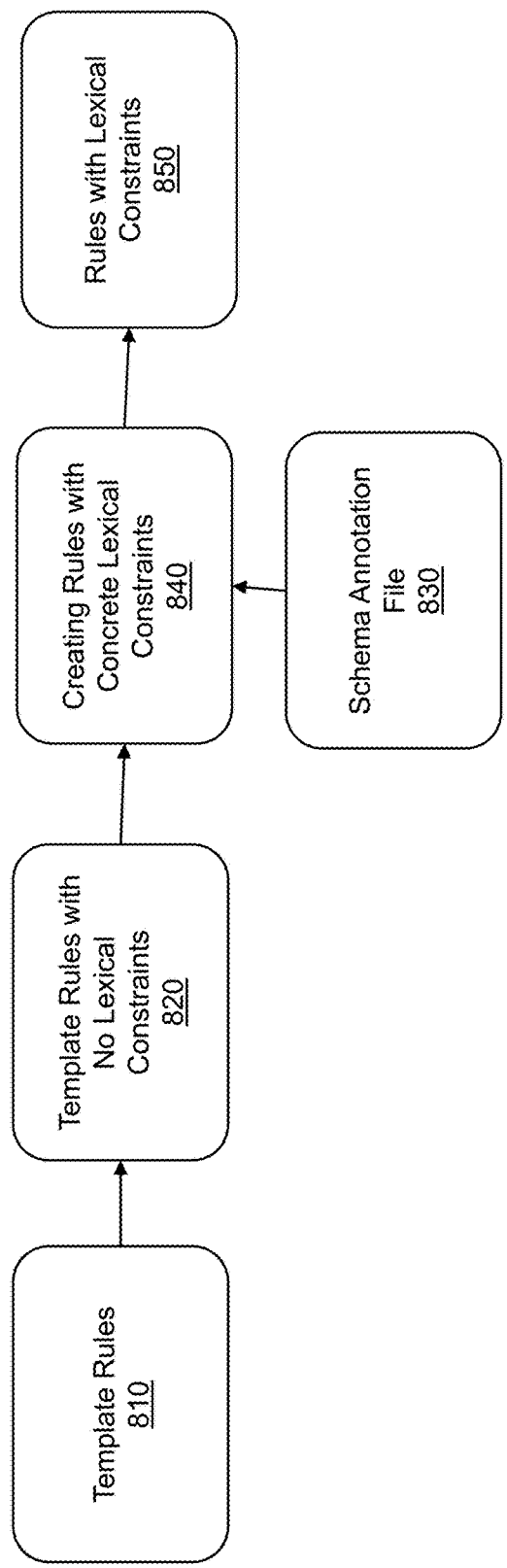
FIG. 8 is a flow diagram illustrating a method for generating rules with lexical constraints according to an embodiment of the invention.

FIG. 7 illustrates rules for the detection of entities and relations according to an embodiment of the invention. A rule can require that a subject (employee), a verb (has), and an object (salary). FIG. 8 is a flow diagram illustrating a method for generating rules with lexical constraints (also referred to herein as "the rules") according to an embodiment of the invention. Template rules are received 810. Template rules with no lexical constraints 820 and a schema annotation file 830 are used to create rules with concrete lexical constraints 840. This results in rules with lexical constraints 850.

To generate rules automatically, a schema annotation file (SAF) can be used. Generating an SAF automatically using only the database and its schema can facilitate the building of a complete automated system that learns what it needs from the database and is ready to answer questions about the data in the database.

Figure 9:
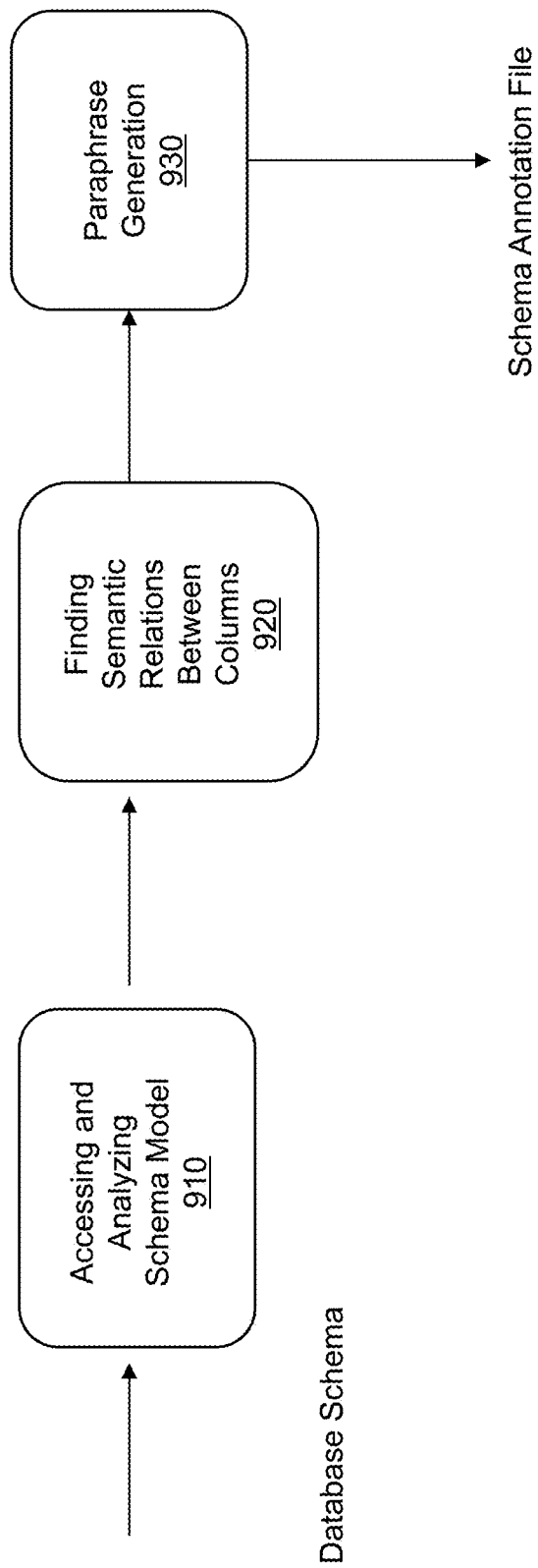
FIG. 9 is a flow diagram illustrating a method for automated schema annotation file creation according to an embodiment of the invention.

FIG. 9 is a flow diagram illustrating a method for automated schema annotation file creation according to an embodiment of the invention. The schema model (also referred to as the database schema) can be accessed and analyzed 910. Semantic relations between columns can be found 920. Knowing the database schema, the system can find all pairs of column names (also table to table and table to column) that are related to each other based on primary/foreign key relation. In one example, the rules provide that "customer buys products" and "manufacturer produces products". If the input question is "John buys products", it can be determined that John is a customer and manufacturer. Without the rules, it cannot be determined who John is.

Paraphrase generation can be performed 930. In one example, the SAF includes "employee has a salary". Paraphrasing as a powerful NLP tool can generate: "employee earns money", "employee makes $", "salary of employee", "employee salary", and/or "employee with salary". Paraphrasing can automatically enrich SAF, thereby enabling the system to answer questions that convey the same concept in various ways.

Detection of entities can produce results that are actually byproducts of the detection process and should not be included in the final SQL query. For example, a user enters the natural language query "what is the highest price of the products that customers bought on Jan. 25, 1999?" The term "products" is detected through the rule "customers buy products", which can lead to the creation of Products.Product_ID dataItem. However, this SQL query may not yield the highest price but rather a price per product because the SQL generator may automatically insert product_id in the GROUP BY clause. To avoid such situations, focus detection can mark dataItems in the natural language query as focus items. If a dataItem has no filter, no aggregation function, and no focus, it can be ignored during SQL generation process.

In at least one embodiment, automatic SQL generation needs to know the schema of the database. The SQL generator can use as input a set of dataItems, where each dataItem is a multiple of (TableName, ColumnName, Filter, AggregationFunction). Knowing the database schema and receiving a set of dataItems, the SQL generator produces the resulting SQL query.

Parser errors can sometimes occur, and often times the dependency tree is not correct. Parsers can produce more than one result, but applications typically use only the best parse, best defined by the parser itself. The system can use multiple parses, where each parse can contribute to correct entities and relations extraction.

Figure 10B:
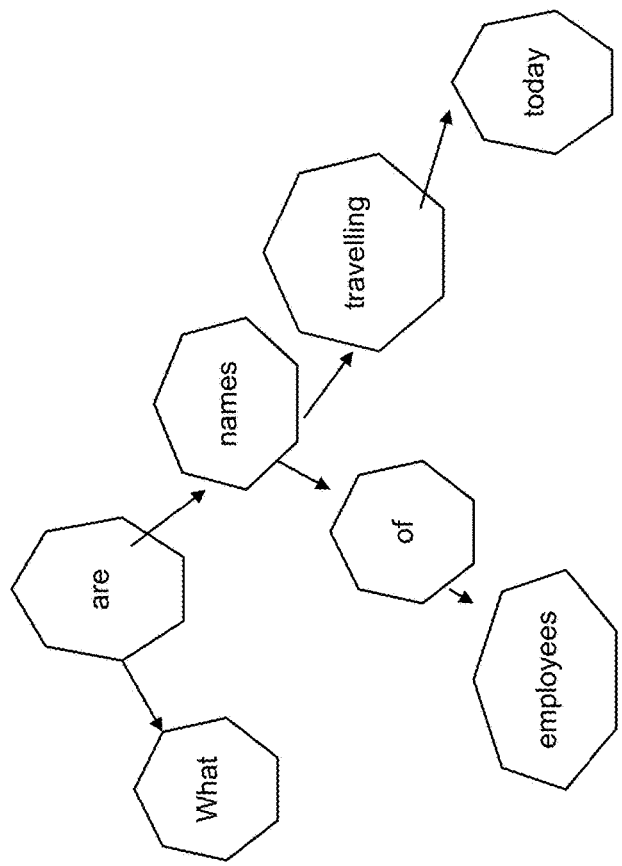
FIGS. 10A and 10B are diagrams illustrating parsing of a natural language query according to an embodiment of the invention.
Figure 10A:
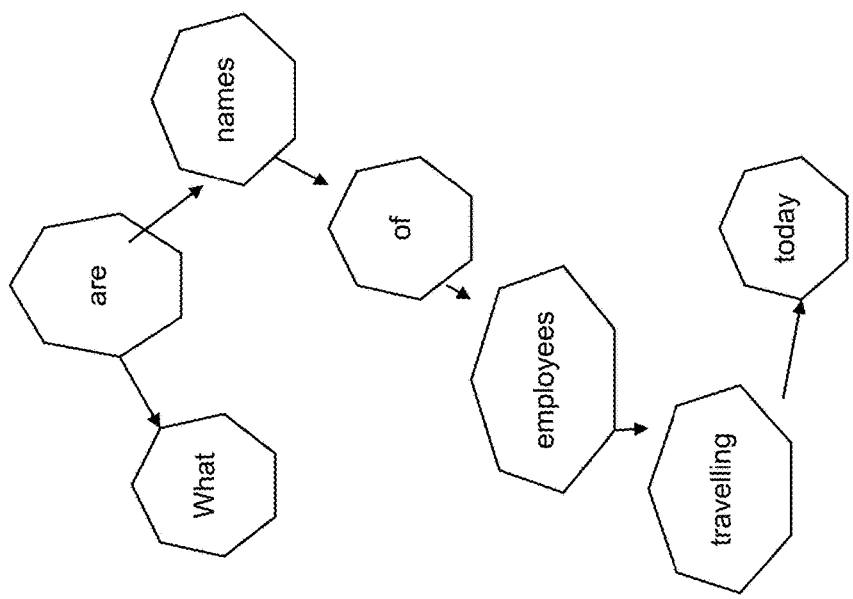

FIGS. 10A and 10B are diagrams illustrating parsing of a natural language query ("what are the names of employees traveling today?") according to an embodiment of the invention. If the user is looking for the "employee travels" relation, the parse illustrated in FIG. 10A will have it whereas the parse illustrated in FIG. 10B will not. If only the best parse is used (e.g., the parse illustrated in FIG. 10B), the "employee travels" relation would not be detected because the node "travelling" depends on the node "names" and not on the node "employees". Use of all parses can allow the system to detect relations when at least one parse has the correct dependency tree fragment for the particular relation that the user is interested in. One parse can have relation #1 correct but relation #2 wrong, and another parse can have relation #2 correct and relation #1 wrong. Use of multiple parses where each parse contributes to the detection of correct relation#i can achieve correct detection of multiple relations.

FIG. 11 is a diagram illustrating parsing of another natural language query ("what products have prices above 150 dollars?") according to an embodiment of the invention. In this natural language query, "above 150 dollars" can be annotated by a numerical comparator annotator; and, the system can detect the "product has price" relation that comes with a filter ">150". Such a successful relation detection with a filter can be possible because the parser correctly connected "above 150 dollars" to prices, which in turn was correctly connected to "products" through "have".

Figure 12:
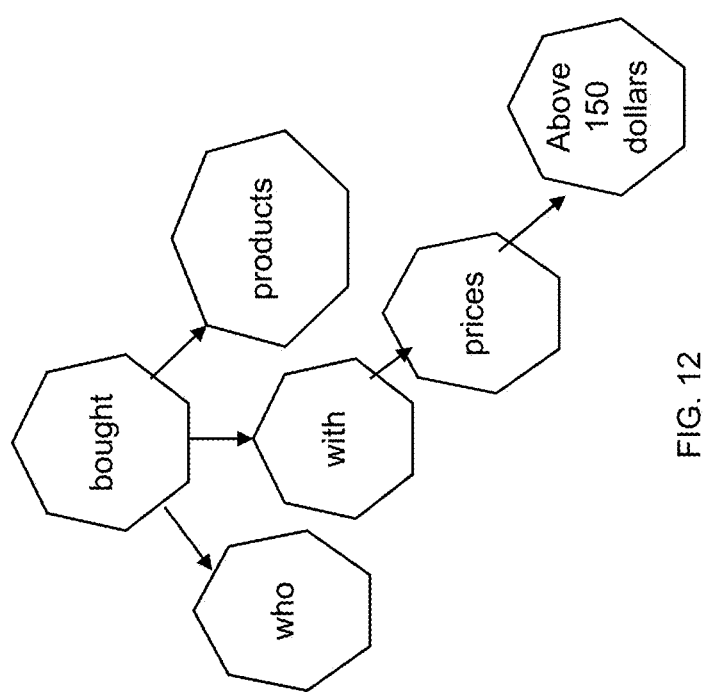
FIG. 12 is a diagram illustrating parsing of yet another natural language query according to an embodiment of the invention.

FIG. 12 is a diagram illustrating parsing of yet another natural language query ("who bought products with prices above 150 dollars?") according to an embodiment of the invention. In this natural language query, "above 150 dollars" can be annotated by the numerical comparator annotator, but the "product has price" relation will not be detected because the node "with" is connected to "bought" (parser logic being "he bought something with his own money"). If the numerical comparator annotated something (e.g., "above 150 dollars"), the system can determine what noun it is connected to (e.g., "prices" in this example). In order to determine what noun can be connected to "prices", the system can go through all of the names in the rules with lexical constraints to find a name that has both "price" and a numerical comparator. This rule can be used as if it "fired" during a normal process of detection of entities and relations. In the case of multiple rules, the question can be posed to a user asking which construct is closer to what the user meant.

The following use case 3 example involves Carl, who is a cable technician for BCC company in Australia. BCC received a call from a customer about their internet speed. Carl arrives at the location and tests the signal strength. In order for Carl to fully evaluate the situation, he needs to know: 1) "whether there were any customer calls in the same vicinity and the issue types?"; 2) "what was the signal strength when measured remotely when customer called?"; 3) "when was the circuit installed?"; and, 4) "was there a similar issue reported recently on the same circuit the customer has?".

Figure 13A:
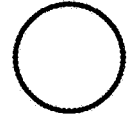
FIG. 13A illustrates a smartphone interface according to an embodiment of the invention.
Figures 13B, 13C:
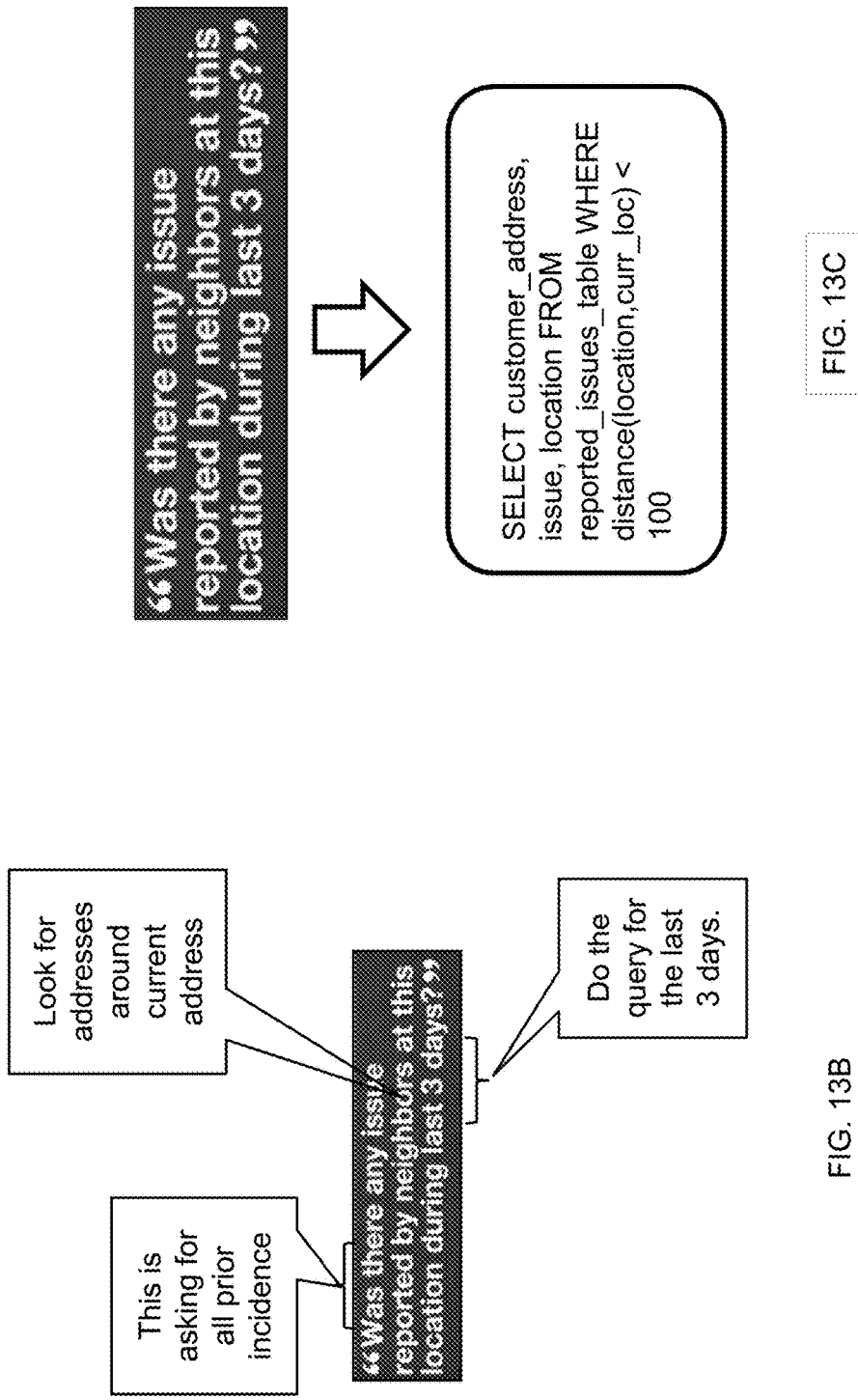
FIG. 13B is a diagram illustrating extraction of key concepts from a natural language query according to an embodiment of the invention.
FIG. 13C is a diagram illustrating translation to SQL commands according to an embodiment of the invention.

FIG. 13A illustrates the interface of Carl's smartphone according to an embodiment of the invention, wherein Carl asks the system his question verbally: "was there an issue reported by neighbors at this location during last 3 days?" Carl's verbal input can be received and processed with a voice processing system in his smartphone. FIG. 13B is a diagram illustrating extraction of key concepts from a natural language query according to an embodiment of the invention. The system can interpret the sentence and extract key concepts and their values and relate the concepts to the database schema. For instance, the system can interpret that Carl is asking for prior incidences from the terms "was there", to look for addresses around the current address from the term "neighbors", and to perform the query for the last 3 days from the terms "last 3 days". Thus, in this example, the identified entities include the terms "was there", "neighbors", and "last 3 days". The system can also obtain Carl's location (e.g., longitude-latitude) from a GPS device or other location capability in Carl's smartphone.

Figure 13D:
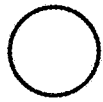
FIG. 13D illustrates search results displayed on the smartphone interface according to an embodiment of the invention.

FIG. 13C is a diagram illustrating translation to SQL commands according to an embodiment of the invention. Specifically, the natural language query "was there an issue reported by neighbors at this location during last 3 days?" is translated to "SELECT customer_address, issue, location FROM reported_issues_table WHERE distance(location, curr_loc)<100". The system can send the SQL commands to the database for execution. FIG. 13D illustrates search results displayed on the smartphone interface according to an embodiment of the invention. Thus, Carl can see that two neighbors experienced slow or no connectivity in the past 3 days.

The following use case 4 example involves John, who is the field worker for ABC Utility company in the United States. When John receives a work order, he goes to the field to visit, evaluate, and resolve the issue. ABC Utility recently installed an in-memory database management system to improve the efficiency of accessing asset history data during field visits. ABC Utility wants to improve the data quality of their asset management system, when a visit is completed. When John arrives at the location, he needs to know: 1) "when was the last time the circuit was fixed?", 2) "what was the last issue on the circuit?", 3) "when was the circuit originally installed?", 4) "what was the last report on the circuit?", 5) "what was changed in the last repair?". After John repairs the issue, he can update the asset records in the database with the following information: 1) whether the issue is resolved or needs a follow-up visit by another crew technician, 2) what was the root cause of the issue? 3) whether he sees some other issue (pole/cable/tree trimming) that needs to be attended to in the near future.

Figure 14B:
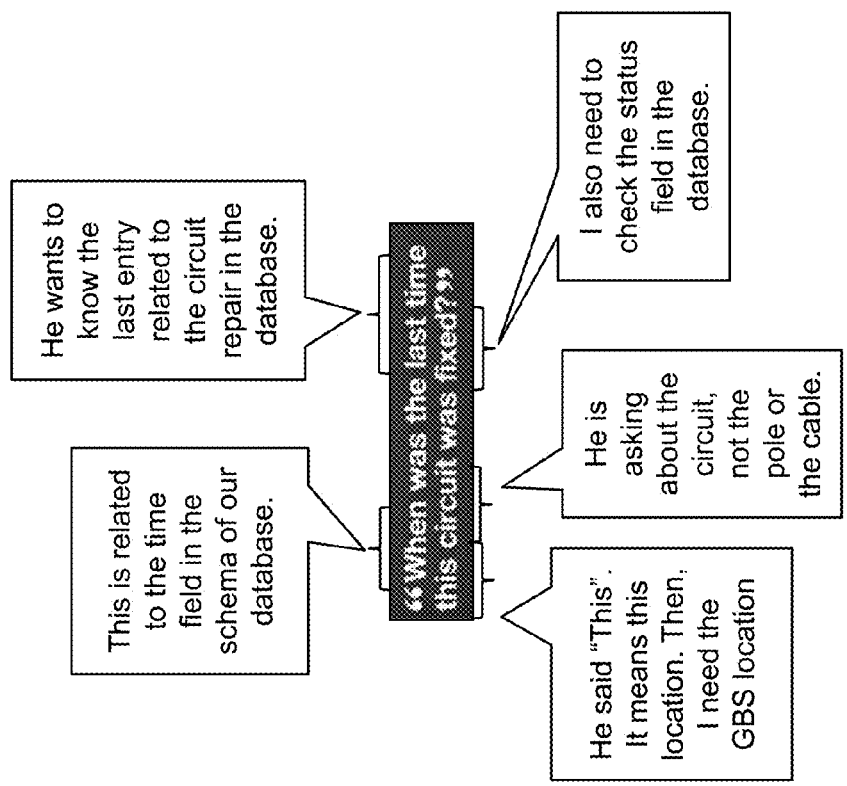
FIG. 14B is a diagram illustrating extraction of key concepts from a natural language query according to an embodiment of the invention.

FIG. 14A illustrates a smartphone interface according to an embodiment of the invention, wherein John asks the system his question verbally: "when was the last time this circuit was fixed?" FIG. 14B is a diagram illustrating extraction of key concepts from a natural language query according to an embodiment of the invention. The system can interpret the sentence and extract key concepts and their values and relate the concepts to the database schema. For instance, the system can interpret that the query is related to the time field in the schema of the database from the term "when", John wants to know the last entry related to the circuit repair in the database from the terms "last time", the query relates to the current location (e.g., to be determined via GPS) from the term "this", the query is inquiring about the circuit (not the pole or cable) from the term "circuit", the query needs to check the status field in the database from the term "fixed". Thus, in this example, the identified entities include the terms "when", "last time", "this", "circuit", and "fixed". The system can also obtain John's location (e.g., longitude-latitude) from a GPS device in John's smartphone.

Figures 14C, 14D:
FIG. 14C is a diagram illustrating translation to SQL commands according to an embodiment of the invention.
FIG. 14D illustrates search results displayed on the smartphone interface according to an embodiment of the invention.

FIG. 14C is a diagram illustrating translation to SQL commands according to an embodiment of the invention. Specifically, the natural language query "when was the last time this circuit was fixed?" is translated to "SELECT circuit_name, max(date) FROM ASSET_CIRCUIT_TABLE WHERE status="FIXED" AND location= (41.162873, −73.861525)". The system can send the SQL commands to the database for execution. FIG. 14D illustrates search results displayed on the smartphone interface according to an embodiment of the invention. Thus, John can see that circuit CIU3265FX was repaired by Peter Smith on Jan. 4, 2014.

Figure 15:
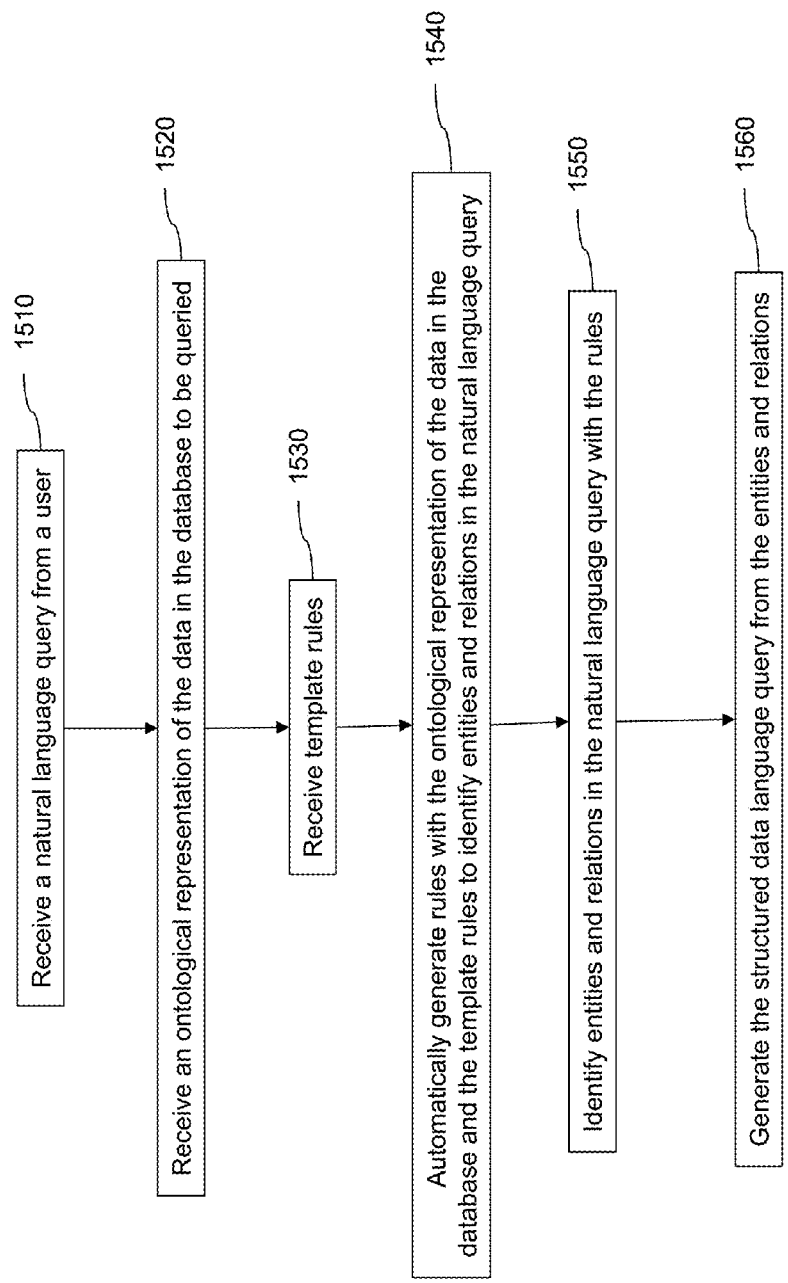
FIG. 15 is a flow diagram illustrating a method for creating a structured data language query according to an embodiment of the invention.
Figure 16:
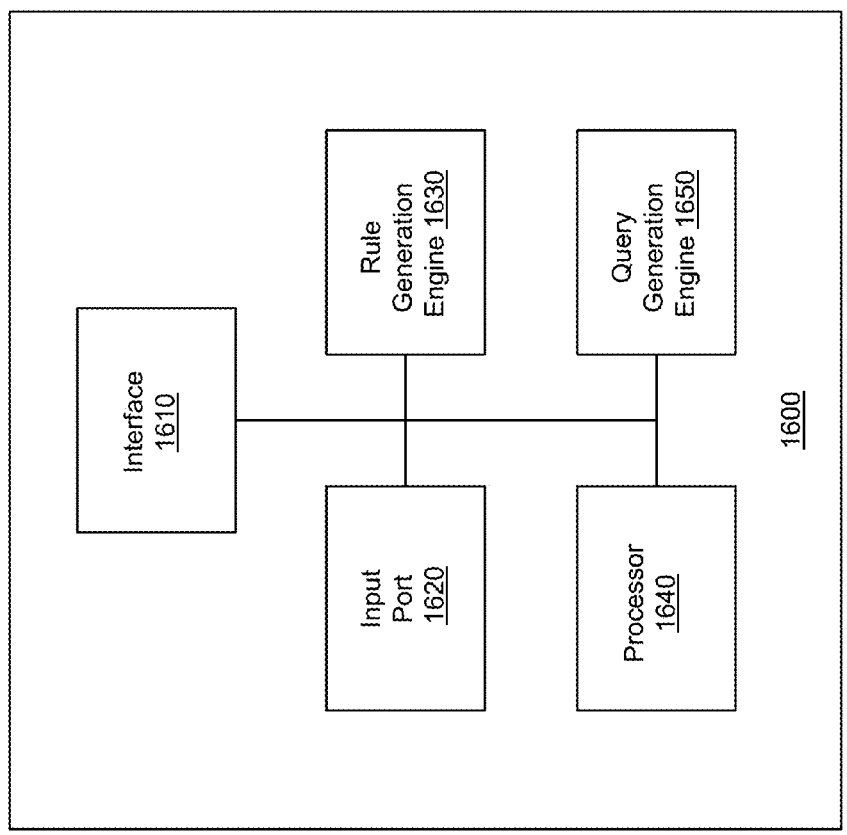
FIG. 16 is a diagram illustrating a system for creating a structured data language query according to an embodiment of the invention.

FIG. 15 is a flow diagram illustrating a method for creating a structured data language (e.g., SQL) query from a natural language query according to an embodiment of the invention; and, FIG. 16 is a diagram illustrating a system 1600 for creating a structured data language query according to an embodiment of the invention. The method illustrated in FIG. 15 can be performed using the system 1600. An interface 1610 can receive a natural language query from a user (e.g., "what are the names of employees in the marketing department?") 1510. As used herein, the term "interface" can include a computer hardware device, such as, for example, a keyboard, touch screen, mouse, or microphone.

An input port 1620 can receive an ontological representation of the data in the database to be queried 1520, wherein the ontological representation can include the names of tables in the database, column names in the tables, and row names in the tables. For example, the ontological representation indicates that there is a table in the database titled "Departments", which has the following column names: department, manager name, phone number, mailing address, and email address, and the following row names: marketing, legal, accounting, advertising, and human resources. In another example, the ontological representation indicates that there is a table in the database titled "Employees", which has the following column names: employee, employee number, start date, manager name, birthday, salary, and department, and the following row names: John Doe, Jane Doe, John Smith, and Jane Smith.

The input port 1620 can also receive template rules (e.g., root=VAR1_has_VAR2 # template rule) 1530, wherein the templates rules are language dependent and schema independent widely used constructs of a language. In at least one embodiment, the template rules include a first variable, a connector, and a second variable, wherein the first variable is an object (noun), the connector includes one of a verb (e.g., "has") or a preposition (e.g., "in"), and the second variable is a subject (noun).

A rule generation engine 1630 can automatically generate rules (e.g., root=employee_has_department) with the ontological representation of the data in the database and the template rules to identify entities and relations in the natural language query 1540. As used herein, the term "automatically" can include performing an action without human interaction (e.g., performing a process step without a direct and explicit prompt by a human to perform the action). The rule generation engine 1630 can be connected to the interface 1610 and/or the input port 1620. In at least one embodiment, the generating of the rules includes replacing the first variable of a template rule with one of the column names (e.g., employee), and replacing the second variable of the template rule with another one of the column names (e.g., department). Thus, for example, for the template rule "root=VAR1_has_VAR2 # template rule", "VAR1" and "VAR2" are replaced with column names "employee" and "department", respectively, to generate the rule "root=employee_has_department".

A processor 1640 can be connected to the rule generation engine 1630 to identify entities and relations in the natural language query with the rules 1550. For example, given the natural language query "what are the names of employees in the marketing department?", the rule generation engine identifies the entities "employees" and "department" and the relations "table name=employees" and "table name=departments".

A query generation engine 1650 can be connected to the processor 1640 to generate the structured data language query from the entities and relations 1560. As used herein, the terms "input port", "rule generation engine", "processor", and "query generation engine" can each include a computer hardware device, such as, for example, a microprocessor, a central processing unit (CPU), a server, an electronic database, etc.

In at least one embodiment of the invention, the query generation engine 1650 automatically generates synonyms of at least one of the entities. For example, the query generation engine automatically generates the synonyms "staff", "worker", and "associate" for the entity "employee". The query generation engine can generate the structured data language query from the synonyms of the entities.

Figure 17:
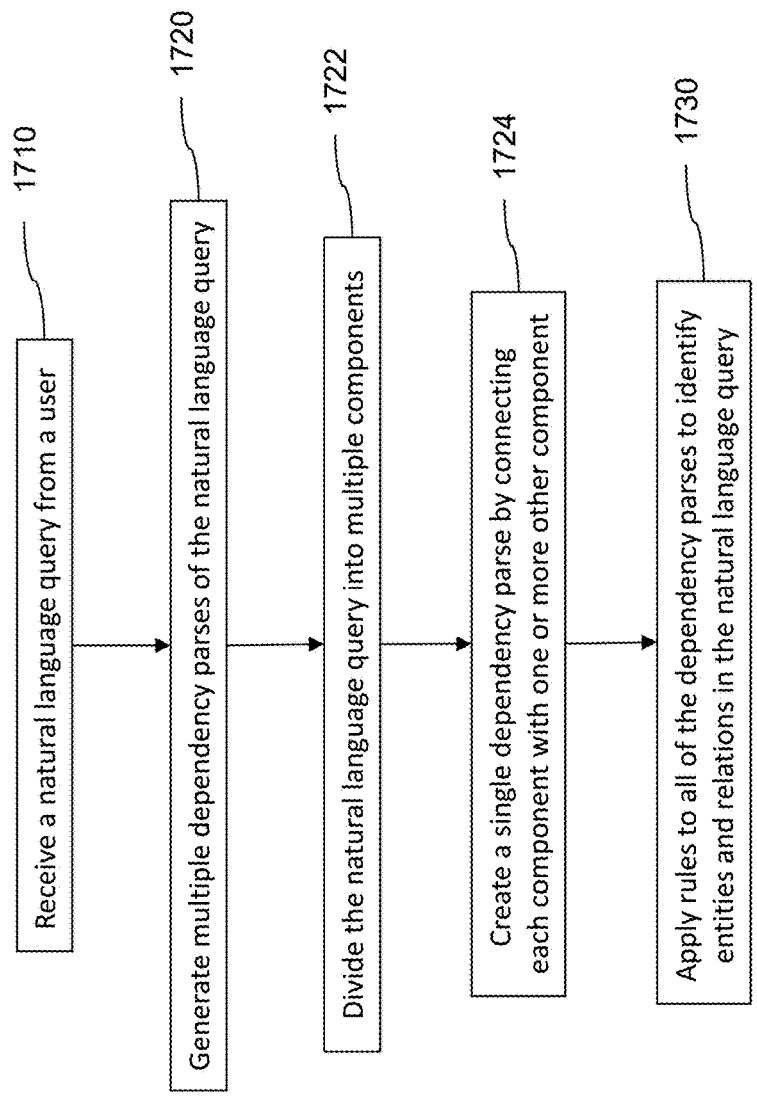
FIG. 17 is a flow diagram illustrating a method for querying a database according to an embodiment of the invention.
Figure 18:
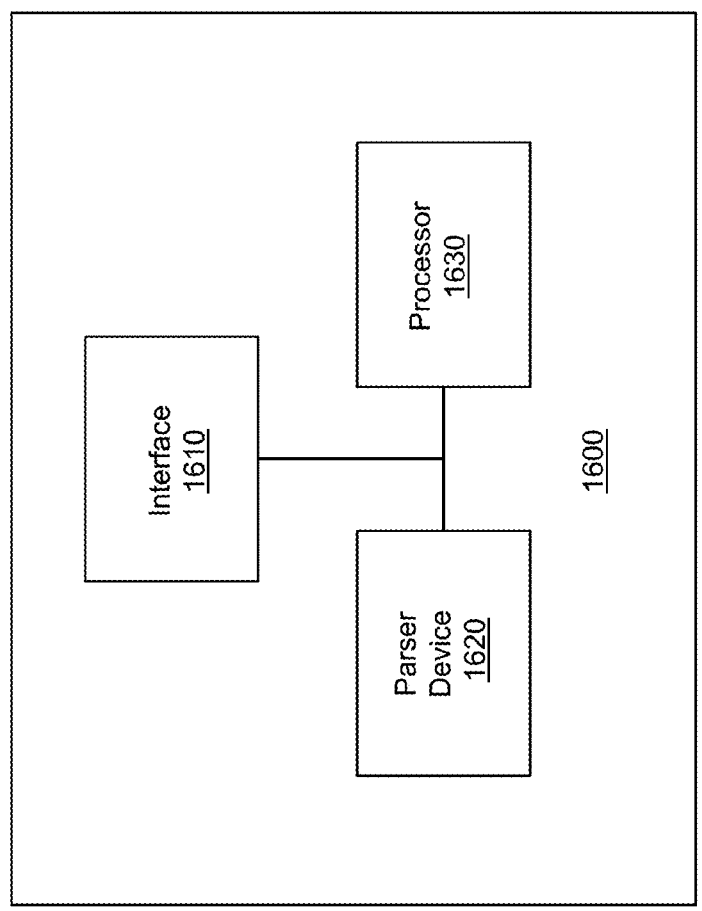
FIG. 18 is a diagram illustrating a system for querying a database according to an embodiment of the invention.

FIG. 17 is a flow diagram illustrating a method for querying a database according to an embodiment of the invention; and, FIG. 18 is a diagram illustrating a system 1800 for querying a database according to an embodiment of the invention. The method illustrated in FIG. 17 can be performed using the system 1800. An interface 1810 can receive a natural language query from a user 1710. For example, a user can type a question using a touchscreen of a mobile device.

A parser device 1820 connected to the interface 1810 can generate multiple dependency parses of the natural language query 1720 (e.g., FIGS. 10A, 10B). The generating of the multiple dependency parses can include dividing the natural language query into multiple components 1722. For example, the natural language query "What are names of employees travelling today" is divided into seven (7) components: "What"; "are"; "names"; "of"; "employees"; "travelling"; and "today".

The generating of the multiple dependency parses can also include creating a single dependency parse by connecting each component of the components with one or more other component of the components 1724. FIGS. 10A and 10B each illustrate a single dependency parse. In FIG. 10A, direct links are created between the components "What" and "are", "are" and "names", "names" and "of", "of" and "employees", "employees" and "travelling", and "travelling" and "today". In FIG. 10B, direct links are created between the components "What" and "are", "are" and "names", "names" and "of", "of" and "employees", "names" and "travelling", and "travelling" and "today". The generating of the multiple dependency parses can include identifying the part of speech of each component (e.g., noun, verb, adverb, adjective). In at least one embodiment, the connecting of each component with one or more other components includes creating a direct link between a noun and a verb and/or an adverb (e.g., "employees" and "travelling"). A direct link can also be created between a verb and two nouns.

In at least one embodiment of the invention, the generating of the multiple dependency parses of the natural language query can include identifying every noun in the natural language query, and connecting every noun in the natural language query to every other noun in the natural language query in different multiple dependency parses. The nouns can be connected to the other nouns via verbs. The number of multiple dependency parses can be greater than the number of words in the natural language query. In at least one embodiment, none of the multiple dependency parses are identical.

A processor 1830 can be connected to the parser device 1820, wherein the processor 1830 can apply rules to all of the dependency parses to identify entities and relations in the natural language query 1730. As used herein, the terms "processor" and "parser device" can each include a computer hardware device, such as, for example, a microprocessor, a central processing unit (CPU), etc.

The applying of the rules to identify entities and relations in the natural language query to all of the multiple dependency parses can include obtaining a rule having one or more nouns and one or more verbs. When a noun of the rule matches a noun in the first multiple dependency parse, the noun in the first multiple dependency parse can be identified as an entity. When a verb of the rule matches a verb in the first multiple dependency parse, the verb in the first multiple dependency parse can be identified as a relation. For example, given the parses illustrated in FIGS. 10A and 10B for the natural language query "what are the names of employees traveling today?", the rules "employee_has_name" and "employee_travels_on_a_date" can be applied to each of the parses to identify the entities "employee name" and "date" and the relation "travel".

In at least one embodiment of the invention, a qualifier in one or more of the multiple dependency parses that is not connected to an entity is identified, where the qualifier includes a numerical comparison (e.g., price is greater than $100), a date comparison (e.g., "widget was bought after January 2011"), and/or a time comparison (e.g., "market closes before 5:00"). In such cases, the processor 1830 can automatically identify the entity that is attached to the qualifier and/or send a question to a user requesting the user to identify the entity that is attached to the qualifier.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 19:
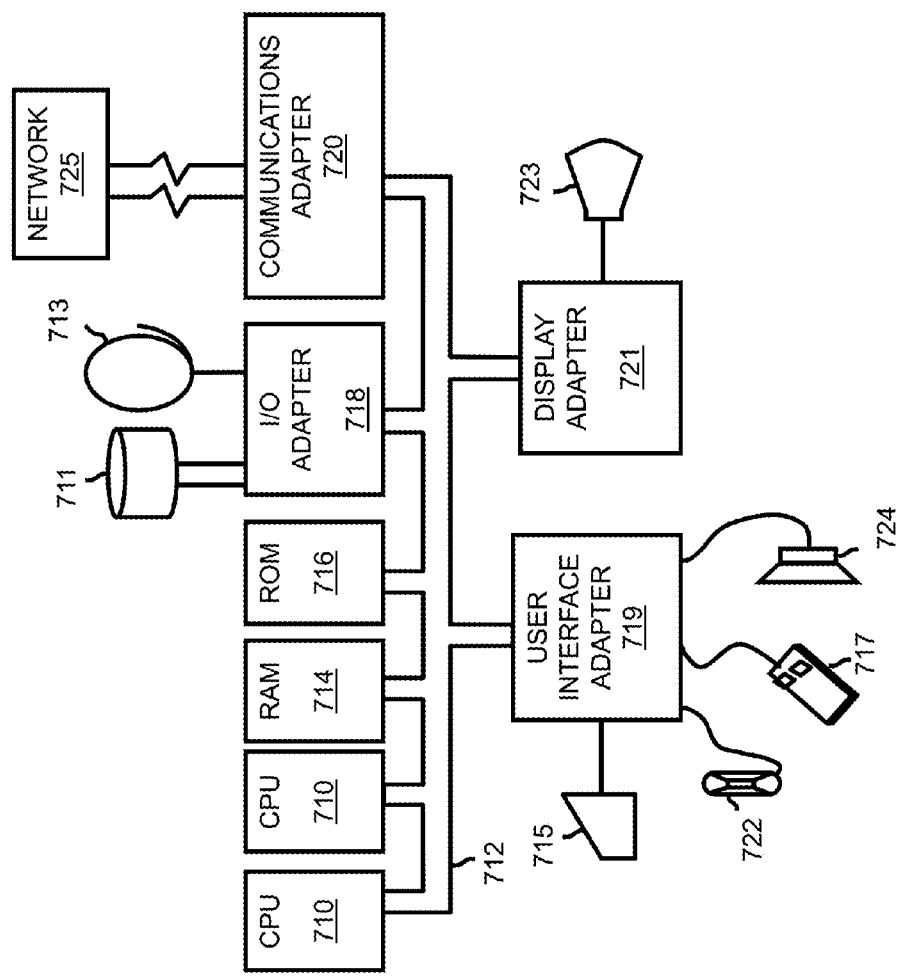
FIG. 19 is a diagram illustrating a computer program product according to an embodiment of the invention.

Referring now to FIG. 19, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 710. The CPUs 710 are interconnected with system bus 712 to various devices such as a random access memory (RAM) 714, read-only memory (ROM) 716, and an input/output (I/O) adapter 718. The I/O adapter 718 can connect to peripheral devices, such as disk units 711 and tape drives 713, or other program storage devices that are readable by the system. The system can read the inventive instructions on the program storage devices and follow these instructions to execute the methodology of at least one embodiment of the invention. The system further includes a user interface adapter 719 that connects a keyboard 715, mouse 717, speaker 724, microphone 722, and/or other user interface devices such as a touch screen device (not shown) to the bus 712 to gather user input. Additionally, a communication adapter 720 connects the bus 712 to a data processing network 725, and a display adapter 721 connects the bus 712 to a display device 723 which may be embodied as an output device such as a monitor, printer, or transmitter, for example.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.'

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 20:
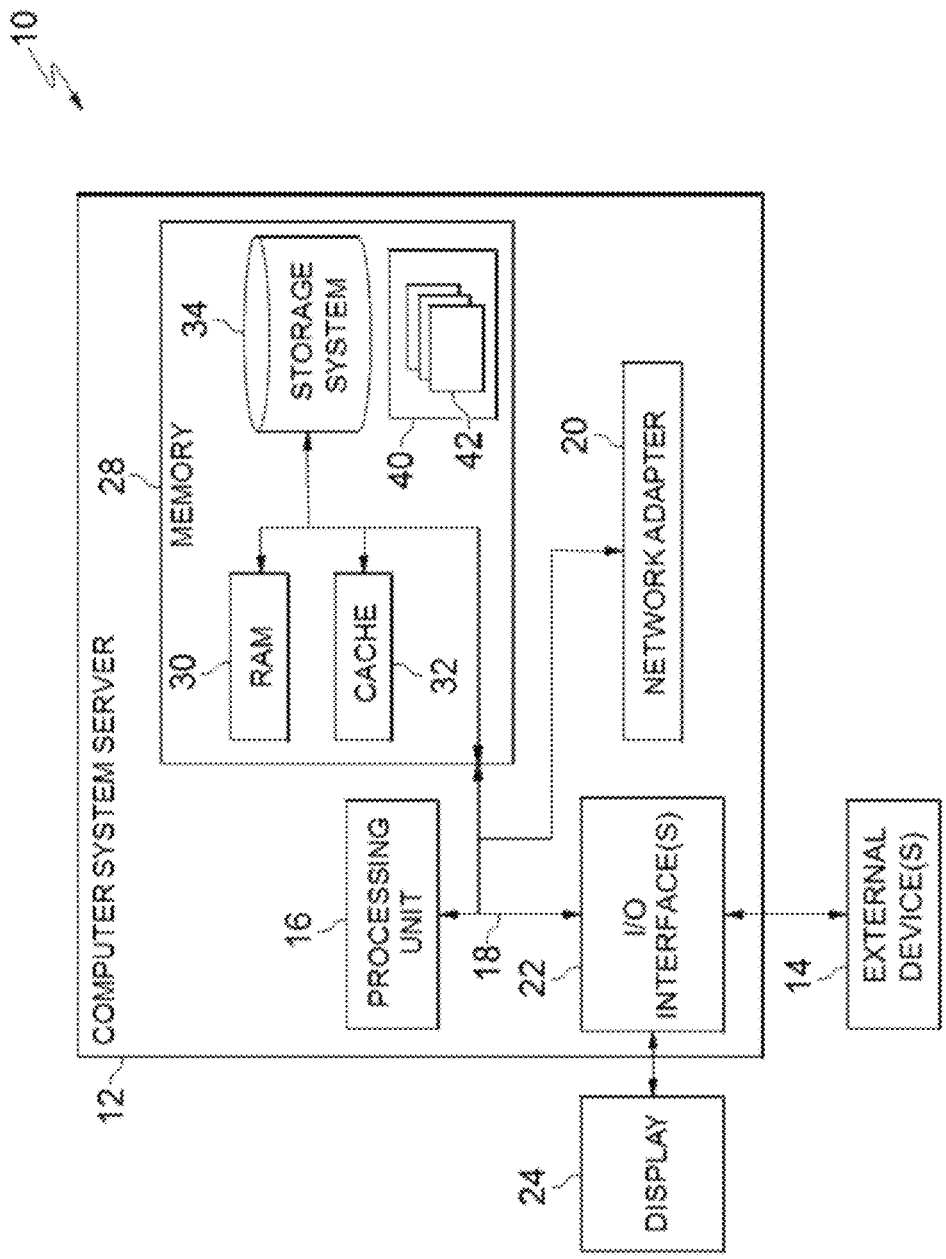
FIG. 20 depicts a cloud computing node according to an embodiment of the present invention.

Referring now to FIG. 20, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer systemexecutable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 20, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 21:
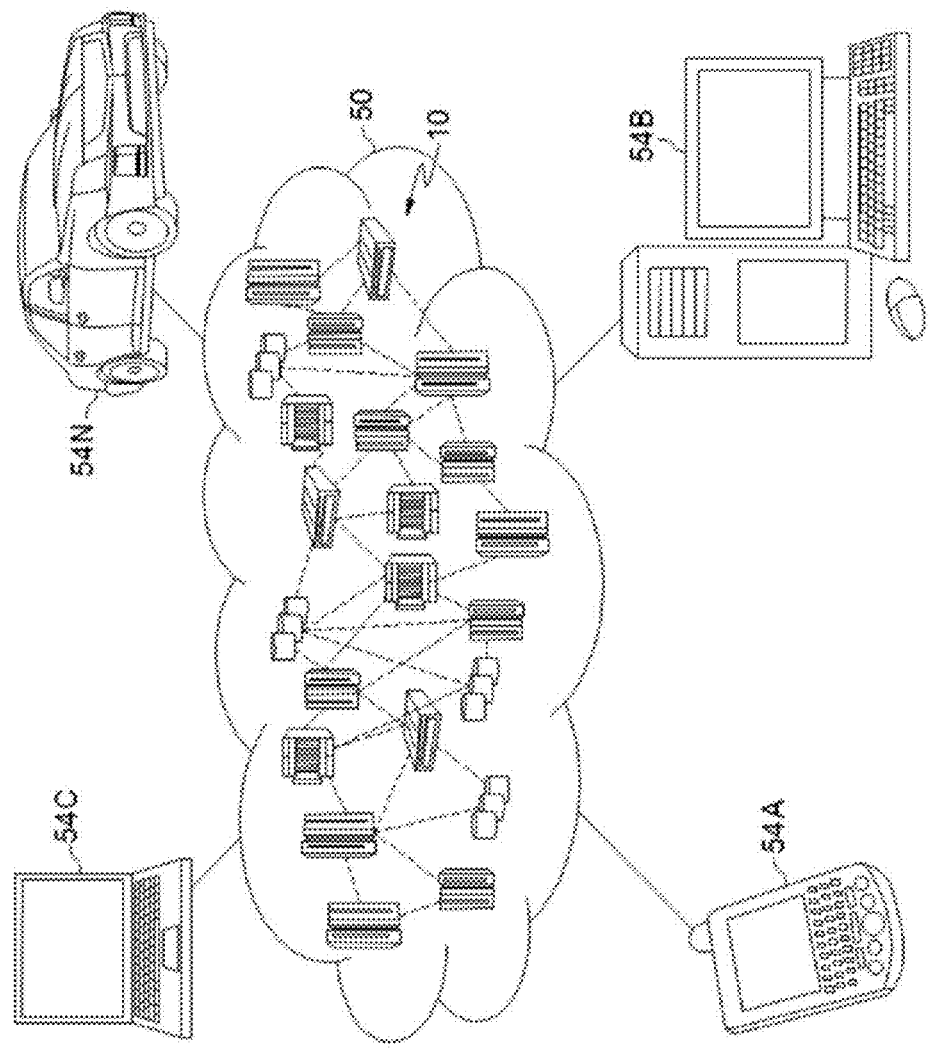
FIG. 21 depicts a cloud computing environment according to an embodiment of the present invention.

Referring now to FIG. 21, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 21 are intended to be illustrative only and that computing nodes 10 and cloud computing environment 50 can communicate with any type of computerized device over any type of network and/or network addressable connection (e.g., using a web browser).

Figure 22:
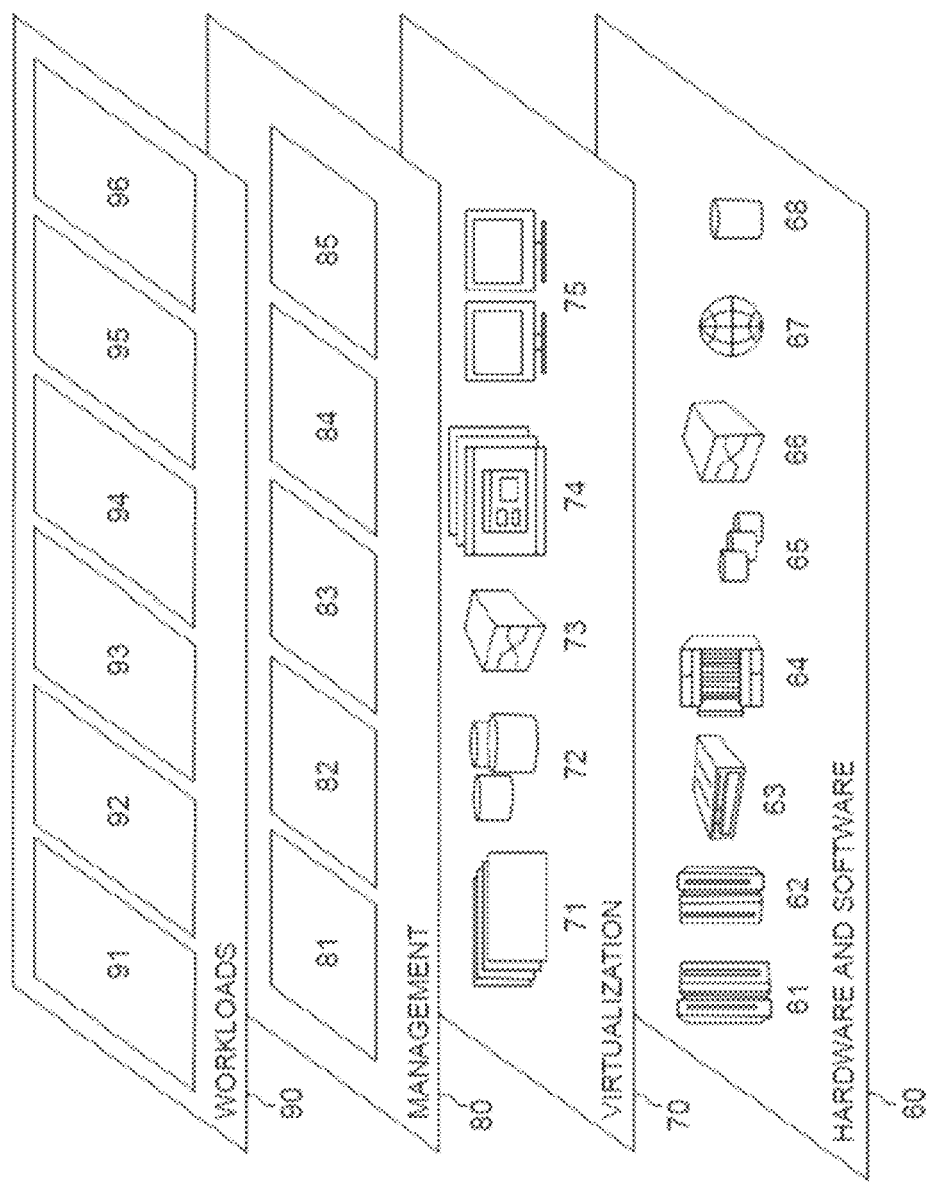
FIG. 22 depicts abstraction model layers according to an embodiment of the present invention.

Referring now to FIG. 22, a set of functional abstraction layers provided by cloud computing environment 50 (FIG. 21) is shown. It should be understood in advance that the components, layers, and functions shown in FIG. 22 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enhanced e-mail return receipts based on cognitive considerations 96.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   receiving a natural language query from a user with an interface;
   generating multiple dependency parses of the natural language query with a parser device connected to the interface, said generating of the multiple dependency parses including:
      dividing the natural language query into multiple components by identifying a part of speech of each component, wherein the part of speech includes one of a noun, a verb, an adverb, and an adjective, and
      creating a single dependency parse by connecting each component with at least one other component;
   applying rules to all of the multiple dependency parses with a processor connected to the parser device to identify entities and relations in the natural language query, and
   generating a structured data language query to a database from the entities and relations,
   wherein the number of multiple dependency parses is greater than the number of words in the natural language query.

2. The method according to claim 1, wherein said connecting includes creating a direct link between a noun and at least one of a verb and an adverb.

3. The method according to claim 1, wherein said connecting includes creating a direct link between a verb and two nouns.

4. The method according to claim 1, wherein none of the multiple dependency parses are identical.

5. The method according to claim 1, wherein said generating multiple dependency parses of the natural language query includes:
   identifying every noun in the natural language query; and
   connecting every noun in the natural language query to every other noun in the natural language query in different multiple dependency parses, wherein nouns are connected to other nouns via verbs.

6. The method according to claim 1, wherein said applying rules to identify entities and relations in the natural language query to all of the multiple dependency parses includes:
   obtaining a rule having at least one noun and at least one verb;
   when the at least one noun of the rule matches a noun in a first multiple dependency parse, identifying the noun in the first multiple dependency parse as an entity;
   when the at least one verb of the rule matches a verb in the first multiple dependency parse, identifying the verb in the first multiple dependency parse as a relation.

7. The method according to claim 1, further comprising:
   identifying a qualifier in at least one of the multiple dependency parses that is not connected to an entity, the qualifier including at least one of a numerical comparison, a date comparison, and a time comparison; and automatically identifying an entity that is attached to the qualifier.

8. The method according to claim 1, further comprising:
   identifying a qualifier in at least one of the multiple dependency parses that is not connected to an entity, the qualifier including at least one of a numerical comparison, a date comparison, and a time comparison; and
   sending a question to a user, the question requesting the user to identify an entity that is attached to the qualifier.

9. The method according to claim 1, wherein the interface is a smartphone interface, wherein said receiving the natural language query comprises the user speaking into the smartphone and wherein query results from the database are displayed on the smartphone interface.

10. The method according to claim 9, further comprising obtaining a location from the smartphone.

11. A method, comprising:
    receiving a natural language query from a user with an interface;
    generating multiple dependency parses of the natural language query with a parser device connected to the interface, said generating of the multiple dependency parses including:
       dividing the natural language query into multiple components, and
       creating a single dependency parse by connecting each component with at least one other component; and
    applying rules to all of the multiple dependency parses with a processor connected to the parser device to identify entities and relations in the natural language query, said applying rules to identify entities and relations in the natural language query to all of the multiple dependency parses including:
    obtaining a rule having at least one noun and at least one verb,
    when the at least one noun of the rule matches a noun in a first multiple dependency parse, identifying the noun in the first multiple dependency parse as an entity,
    when the at least one verb of the rule matches a verb in the first multiple dependency parse, identifying the verb in the first multiple dependency parse as a relation, and
    generating a structured data language query to a database from the entities and relations,
    wherein the number of multiple dependency parses is greater than the number of words in the natural language query.

12. The method according to claim 11, wherein said generating of the multiple dependency parses includes identifying a part of speech of each component, wherein the part of speech includes one of a noun, a verb, an adverb, and an adjective.

13. The method according to claim 11, wherein said connecting each component with at least one other component includes creating a direct link between a noun and at least one of a verb and an adverb.

14. The method according to claim 11, wherein said connecting includes creating a direct link between a verb and two nouns.

15. The method according to claim 11, wherein none of the multiple dependency parses are identical.

16. The method according to claim 11, wherein said generating multiple dependency parses of the natural language query includes:
    identifying every noun in the natural language query; and
    connecting every noun in the natural language query to every other noun in the natural language query in different multiple dependency parses, wherein nouns are connected to other nouns via verbs.

17. The method according to claim 11, further comprising:
   identifying qualifiers in at least one of the multiple dependency parses that is not connected to an entity, the qualifiers including a numerical comparison, a date comparison, and a time comparison; and
   automatically identifying an entity that is attached to the qualifier.

18. The method according to claim 11, further comprising:
   identifying qualifiers in at least one of the multiple dependency parses that is not connected to an entity, the qualifiers including a numerical comparison, a date comparison, and a time comparison; and
   sending a question to a user, the question requesting the user to identify an entity that is attached to the qualifier.

19. A computer program product comprising:
   a non-transitory computer readable storage medium having stored thereon:
   first program instructions executable by a device to cause the device to receive a natural language query from a user;
   second program instructions executable by the device to cause the device to generate multiple dependency parses of the natural language query, wherein the number of multiple dependency parses is greater than the number of words in the natural language query, said second program instructions cause the device to:
   divide the natural language query into multiple components, and
   create a single dependency parse by connecting each component of the components with at least one other component of the components; and
   third program instructions executable by the device to cause the device to apply rules to all of the multiple dependency parses with a processor connected to the parser device to identify entities and relations in the natural language query.

\* \* \* \* \*